US012620201B2

(12) United States Patent (10) Patent No.: US 12,620,201 B2
Roullier et al. (45) Date of Patent: May 5, 2026

(54) TRANSLATING IMAGES BASED ON SEMANTIC INFORMATION

(71) Applicant: Adobe Inc., San Jose, CA (US)

(72) Inventors: Arthur Jules Martin Roullier, Paris (FR); Tamy Boubekeur, Paris (FR); Rosalie Noémie Raphaëlle Martin, Mâcon (FR); Romain Pierre Rouffet, La Mulatiere (FR); Adrien Michel Paul Kaiser, Lyons (FR)

(73) Assignee: Adobe Inc., San Jose, CA (US)

( * ) Notice: Subject to any disclaimer, the term of this patent is extended or adjusted under 35 U.S.C. 154(b) by 253 days.

(21) Appl. No.: 18/517,407

(22) Filed: Nov. 22, 2023

(65) Prior Publication Data

US 2025/0166355 A1 May 22, 2025

(51) Int. Cl.
| | |
|---|---|
| *G06V 10/77* | (2022.01) |
| *G06V 10/764* | (2022.01) |
| *G06V 10/82* | (2022.01) |
| *G06V 20/70* | (2022.01) |

(52) U.S. Cl.
CPC ........ *G06V 10/7715* (2022.01); *G06V 10/764* (2022.01); *G06V 10/82* (2022.01); *G06V 20/70* (2022.01)

(58) Field of Classification Search
CPC .... G06V 10/7715; G06V 20/70; G06V 10/82; G06V 10/764
See application file for complete search history.

(56) References Cited

U.S. PATENT DOCUMENTS

| | | | | |
|---|---|---|---|---|
| 10,395,392 | B1 * | 8/2019 | Kim | G06N 3/08 |
| 2022/0012536 | A1 * | 1/2022 | Wang | G06V 30/19173 |
| 2022/0130499 | A1 * | 4/2022 | Zhou | G06F 16/24522 |
| 2022/0319065 | A1 * | 10/2022 | Kumawat | G06V 10/82 |
| 2024/0221912 | A1 * | 7/2024 | Aladahalli | A61B 8/5207 |
| 2025/0045968 | A1 * | 2/2025 | Guleryuz | G06N 3/09 |

OTHER PUBLICATIONS

Zhu, Jun-Yan, et al. "Unpaired image-to-image translation using cycle-consistent adversarial networks." Proceedings of the IEEE international conference on computer vision. 2017. (Year: 2017).*
Wang, Ting-Chun, et al. "High-resolution image synthesis and semantic manipulation with conditional gans." Proceedings of the IEEE conference on computer vision and pattern recognition. 2018. (Year: 2018).*

(Continued)

*Primary Examiner* — Utpal D Shah
(74) *Attorney, Agent, or Firm* — FIG. 1 Patents

(57) ABSTRACT

In implementation of techniques for translating images based on semantic information, a computing device implements a translation system to receive an input image in a first format, encoded semantic information describing a domain of the input image, and a selection of a second format. The translation system decodes the encoded semantic information using a machine learning model. The translation system then generates an output image in the second format by translating the input image from the first format to the second format using the machine learning model, the machine learning model guided by the decoded semantic information. The translation system then displays the output image in the second format in a user interface.

20 Claims, 7 Drawing Sheets

(56) References Cited

OTHER PUBLICATIONS

Alotaibi, Aziz. "Deep generative adversarial networks for image-to-image translation: A review." Symmetry 12.10 (2020): 1705. (Year: 2020).*

Isola, Phillip, et al. "Image-to-image translation with conditional adversarial networks." Proceedings of the IEEE conference on computer vision and pattern recognition. 2017. (Year: 2017).*

Meseguer-Brocal, Gabriel , et al., "Conditioned-U-Net: Introducing a Control Mechanism in the U-Net for Multiple Source Separations", Cornell University, arXiv Preprint, arXiv.org [retrieved Nov. 17, 2023]. Retrieved from the Internet <https://arxiv.org/pdf/1907.01277.pdf>, Jul. 2, 2019, 7 pages.

Mirza, Mehdi , et al., "Conditional Generative Adversarial Nets", Nov. 6, 2014, 7 pages.

* cited by examiner

200

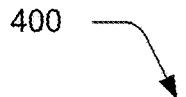
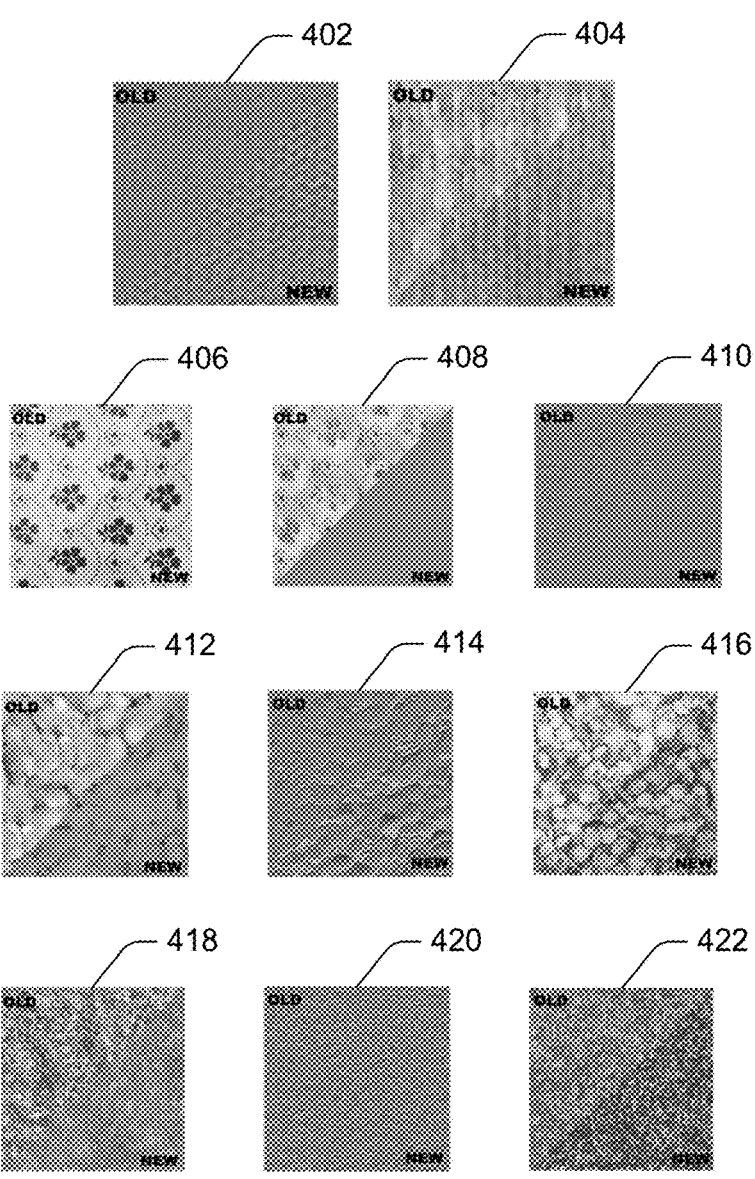
Fig. 4

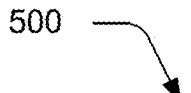

500

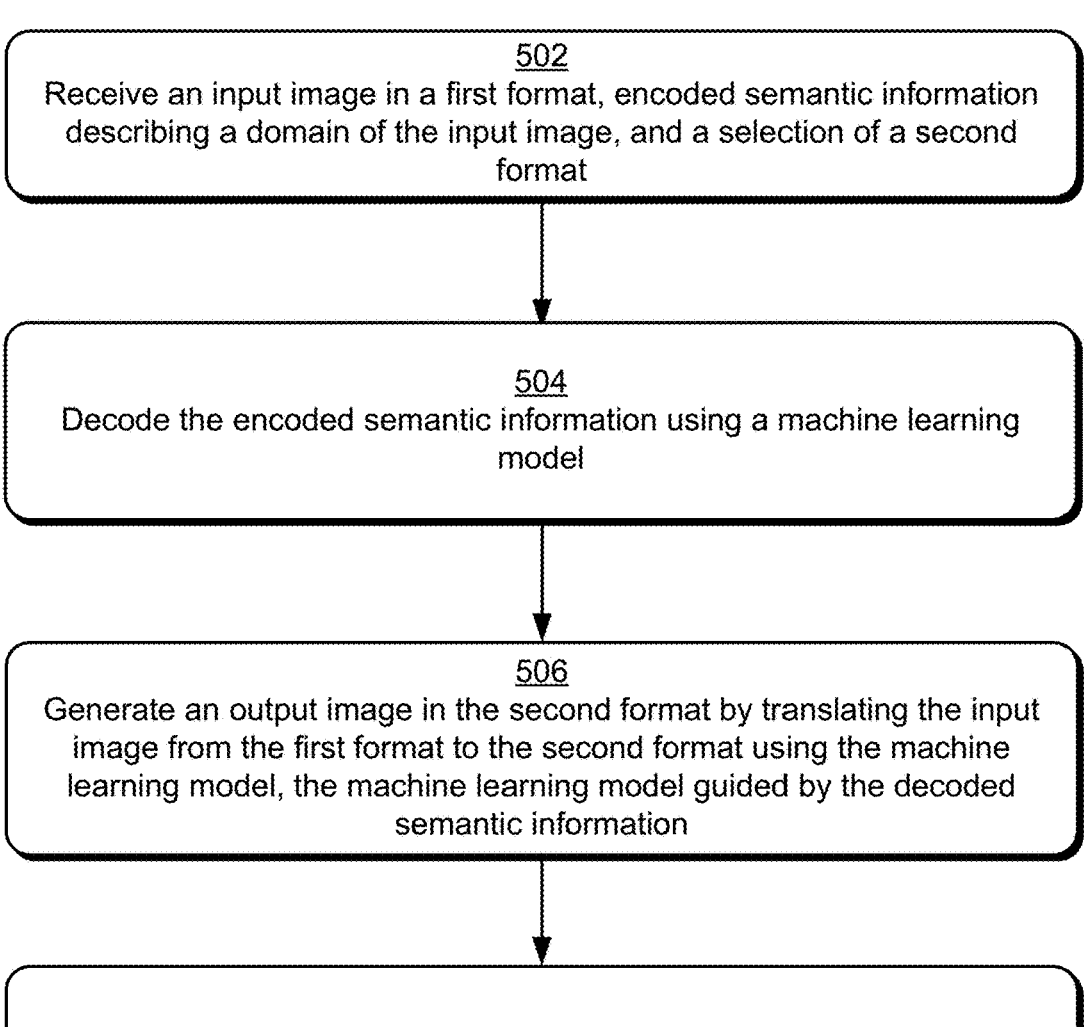

502
Receive an input image in a first format, encoded semantic information describing a domain of the input image, and a selection of a second format

504
Decode the encoded semantic information using a machine learning model

506
Generate an output image in the second format by translating the input image from the first format to the second format using the machine learning model, the machine learning model guided by the decoded semantic information

508
Display the output image in the second format in a user interface

Fig. 5

600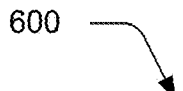

> 602
> Receive an embedding vector at a connection between an encoding path and a decoding path of a machine learning model, the embedding vector including encoded semantic information describing features of a domain of a digital image > 604
> Decode the encoded semantic information of the embedding vector using the decoding path of the machine learning model > 606
> Train the machine learning model on the domain of the digital image while decoding the encoded semantic information of the embedding vector using the decoding path of the machine learning model

TRANSLATING IMAGES BASED ON SEMANTIC INFORMATION

BACKGROUND

A U-Net is a type of convolutional neural network (CNN) architecture that is commonly used for image segmentation and analysis. The U-Net architecture is characterized by its U-shaped structure formed using an encoder and a decoder. The U-Net architecture also features skip connections that connect the encoder and the decoder at multiple levels. The skip connections help preserve fine-grained details and spatial information, allowing the network to produce precise segmentation maps and image filters. U-Nets are widely applied to various tasks, including biomedical image segmentation (including cell and tissue segmentation), image-to-image translation tasks, and other tasks. However, some applications of U-Nets result in visual inaccuracies, computational inefficiencies, and increased power consumption in real world scenarios.

SUMMARY

Techniques and systems for translating images based on semantic information are described. In an example, a translation system receives an input image in a first format, encoded semantic information describing a domain of the input image, and a selection of a second format. For example, the input image is one of multiple layered channel images that form an overall image, and the encoded semantic information corresponds to a classification label in an index of multiple classification labels. In some examples, the classification label in the index is manually selected. In other examples, the classification label in the index is automatically selected based on automated classification. Additionally or alternatively, the encoded semantic information is an embedding vector that corresponds to the classification label in the index.

The translation system decodes the encoded semantic information using a machine learning model. The translation system then generates an output image in the second format by translating the input image from the first format to the second format using the machine learning model, the machine learning model guided by the decoded semantic information. The translation system then displays the output image in the second format in a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 4 depicts a chart comparing material channels generated using translating images based on semantic information to channel images generated using conventional techniques.

FIG. 5 depicts a procedure in an example implementation of translating images based on semantic information.

FIG. 6 depicts a procedure in an additional example implementation of translating images based on semantic information.

DETAILED DESCRIPTION

Overview

Figure 1:
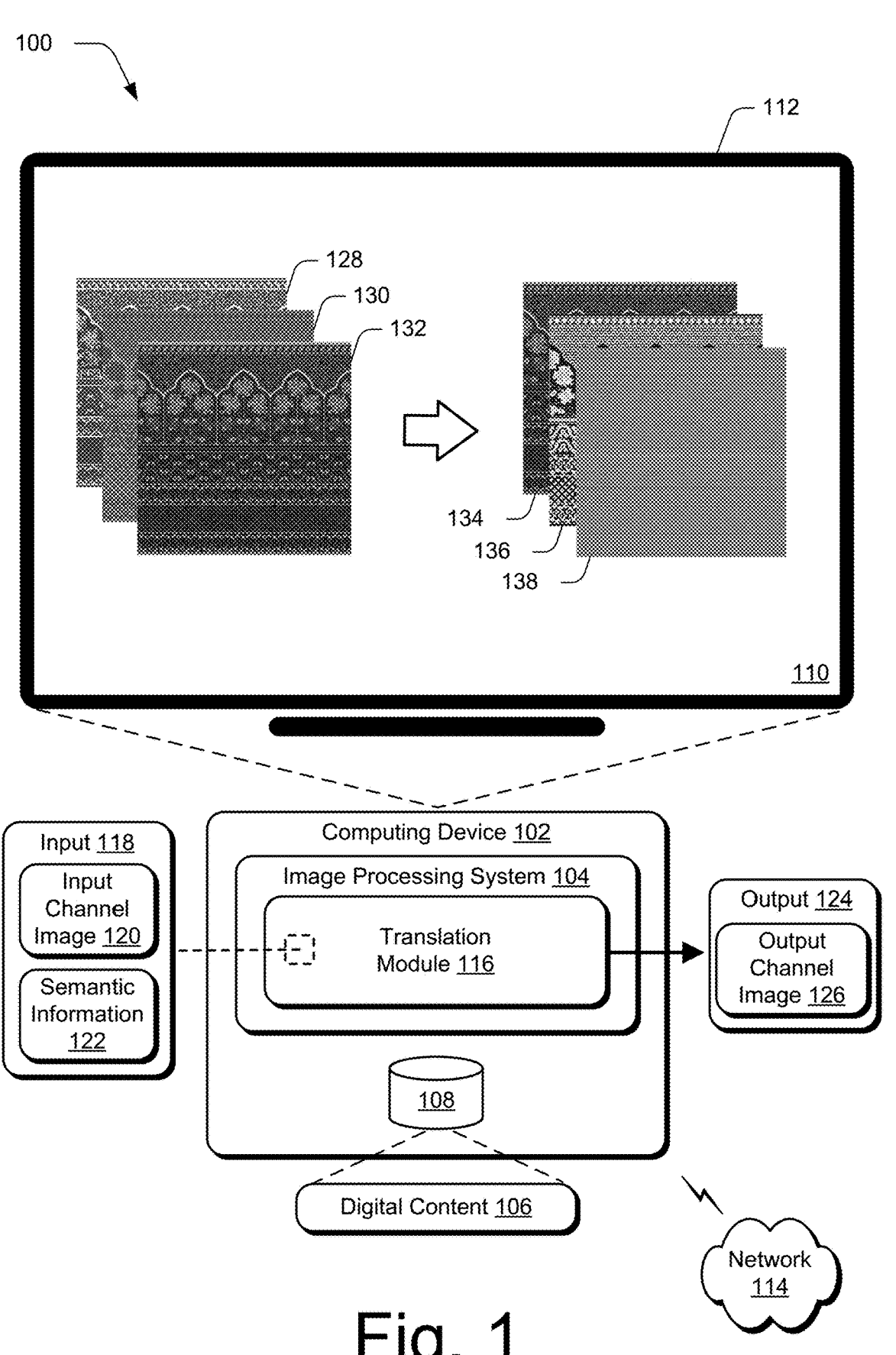
FIG. 1 is an illustration of a digital medium environment in an example implementation that is operable to employ techniques and systems for translating images based on semantic information as described herein.

Image translation tasks involve translating a channel image to a different type of channel image to support a variety of tasks, including image segmentation, style transfer, depth estimation, and material estimation in digital images. A channel image is a component or layer that makes up an image. For example, an RGB digital image includes a red channel image, a green channel image, and a blue channel image layered together. Some image translation tasks involve translating the RGB channel images to a different collection of channels. Specifically, image translation of RGB channel images that depict materials supports physically-based rendering ("PBR") for three dimensional (3D) materials in gaming, architecture, design, fashion, film, or other applications. For example, an RGB image is captured that depicts a ceramic tile wall, with the intention of applying the ceramic tile wall to a 3D wall in a virtual environment. To accomplish this, channel images of the RGB image are translated to channel images of a material map, including a height channel, a base color channel, and a normal channel. However, translating channel images using conventional image translation techniques is time-consuming and costly.

Conventional image translation techniques involve training a U-Network ("U-Net") on a domain specific to a task. For example, to translate channel images of the digital image depicting the ceramic tile wall, the entire U-Net is trained specifically on images of ceramic tile. However, these conventional image translation techniques are time consuming because U-Nets are trained separately for different domains. For example, one U-Net is trained on a domain for fabric materials while a different U-net is trained on a domain for leather materials. This training separation also results in higher training costs, deployment costs, and shipping limitations in desktop products involving the U-Nets.

Techniques and systems are described for translating images based on semantic information that overcome these limitations. A translation system begins in this example by receiving an input channel image and semantic information describing the input channel image. The input channel image in this example is the RGB image depicting the ceramic tile wall, and the semantic information describes properties of ceramic materials. The semantic information is specific to a domain or content depicted in the input channel image. For example, the domain is ceramic material. The semantic information is stored in an index that also includes different semantic information corresponding to multiple different domains. In some examples, the index includes different semantic information for multiple different domains that correspond to different types of materials, including fabric, leather, parquet wood, ceramic, and other materials that are applicable to different situations depending on what type of material is depicted in the input channel image. The semantic information includes an embedding vector, which is an encoded representation of the domain. In this example, the embedding vector is specific to the ceramic material and includes encoded information to supplement the U-Net.

Because the embedding vector is input into a bottleneck of the U-Net, the translation system repeats the embedding vector to fit a spatial size of the bottleneck of the U-Net and concatenates the repeated embedding vector before input into the U-Net. The U-Net then decodes the repeated embedding vector. During decoding, the U-Net learns properties of the material described by the semantic information, and the U-Net leverages the properties of the material to generate an output channel image without restraining training of the entire U-Net to a specific domain of materials. In this example, the U-Net generates channel images of a material map based on the ceramic tile wall, including a height channel, a base color channel, and a normal channel that are usable to apply the ceramic tile wall to a 3D surface in a virtual environment.

Translating images based on semantic information in this manner addresses the technical challenges of conventional image translation techniques that are limited to training multiple U-Nets separately for different domains. This is because supplementing a U-Net with semantic information specific to a domain related to the input channel image allows the U-Net to be dynamically re-configured for application to multiple domains. For example, the U-Net receives an input including semantic information describing properties of fabric to translate channel images depicting a fabric design. The U-Net is then re-used, and the U-Net receives an input including semantic information describing properties of wood to translate channel images depicting wood parquet flooring. Because multiple U-Nets are not trained for different domains, but a single U-Net is supplemented with semantic information, training time and other costs are reduced compared to conventional image translation techniques.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques and systems for translating images based on semantic information described herein. The illustrated digital medium environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), an augmented reality device, and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices, such as multiple servers utilized by a business to perform operations "over the cloud" as described in FIG. 7.

The computing device 102 also includes an image processing system 104. The image processing system 104 is implemented at least partially in hardware of the computing device 102 to process and represent digital content 106, which is illustrated as maintained in storage 108 of the computing device 102. Such processing includes creation of the digital content 106, representation of the digital content 106, modification of the digital content 106, and rendering of the digital content 106 for display in a user interface 110 for output, e.g., by a display device 112. Although illustrated as implemented locally at the computing device 102, functionality of the image processing system 104 is also configurable entirely or partially via functionality available via the network 114, such as part of a web service or "in the cloud."

The computing device 102 also includes a translation module 116 which is illustrated as incorporated by the image processing system 104 to process the digital content 106. In some examples, the translation module 116 is separate from the image processing system 104 such as in an example in which the translation module 116 is available via the network 114.

The translation module 116 is configured to receive an input 118 including an input channel image 120 and semantic information 122 and to generate an output 124 including an output channel image 126. For example, the translation module 116 translates the input channel image 120, or multiple input channel images, into an output channel image 126 or multiple output channel images that are different from the input channel image 120.

The input channel image 120 is a component or layer that makes up an image. Channel images are available in a variety of models and formats. In this example, the input includes three input channel images that are layered to form an image: a red channel 128, a green channel 130, and a blue channel 132, collectively forming an RGB image. In this example, the RGB image depicts a section of a fabric material. In the RGB image, the red channel 128 stores intensities of red color in pixels of the red channel 128, the green channel 130 stores intensities of green color in pixels of the green channel 130, and the blue channel 132 stores intensities of blue color in pixels of the blue channel 132. In other examples, the output includes one output channel image or any number of different output channel images. Other examples of channel images include individual channels of CMYK (cyan, magenta, yellow, and key) channels, grayscale channels, alpha channels denoting transparency, HSL (hue, saturation, and luminance channels, chrominance channels, lab channels (lightness, green to blue, and blue to yellow) channels, depth channels, or any other collection of channels.

Likewise, the output in this example includes multiple layered output channel images, including a height channel 134, base color channels 136, and normal channels 138. For example, the height channel 134 stores information related to depth and detail of a surface, creating a visual illusion of height variations. The base color channels 136 define color (e.g., in different RGB channels) and overall appearance of the surface and specify a base color or texture applied to the surface. The normal channels 138 encode information about surface normals of a surface (e.g., in an x-direction channel and a y-direction channel), and pixels in the normal channels 138 represent a perturbation of the surface normal, which gives the illusion of fine details and surface bumps without modifying the geometry of the surface. In other examples, the output includes one output channel image or a number of different output channel images. Specific types of output channel images are pre-determined based on what output channel images are desired. In some examples, the translation module 116 also receives an input including a selection of a format for the output channel image 126. For example, the selection specifies the type of output channel images that are generated by translating the input channel image 120.

To generate an output channel image 126 that is an accurate translation of a material depicted in the input channel image 120, the translation module 116 also receives semantic information 122, which is additional information describing the material depicted in the input channel image 120. In this example, because the input channel image 120 is a channel of the RGB image depicting the section of the fabric material, the semantic information 122 includes information specific to fabric. In this example, the information specific to fabric is selected by a user from a list of multiple categories of semantic information 122. Other categories of semantic information 122, for example, include wood, leather, plaster, paint, ceramic, and other material types. In other examples, the categories of the semantic information 122 describe other information not limited to material types.

After receiving the semantic information 122, the translation module 116 encodes the semantic information 122 into an embedding vector. The translation module 116 generates a repeated embedding vector to comply with size requirements for a bottleneck of a machine learning model and inputs the repeated embedding vector into the machine learning model. The machine learning model learns features from the semantic information 122 while decoding the repeated embedding vector and leverages the features to generate the output channel image 126 based on the input channel image 120. For example, generation of the output channel image 126 is guided by the decoding of the semantic information 122 from the repeated embedding vector. The translation module 116 repeats this to generate the multiple layered output channel images: the height channel 134, the base color channels 136, and the normal channels 138. Collectively, the height channel 134, the base color channels 136, and the normal channels 138 form an accurate translation of the RGB image into a different collection of channel images.

The translation module 116 then generates an output 124 including the output channel image 126 for display in the user interface 110, further examples of which are described in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Translating Images Based on Semantic Information

Figure 2:
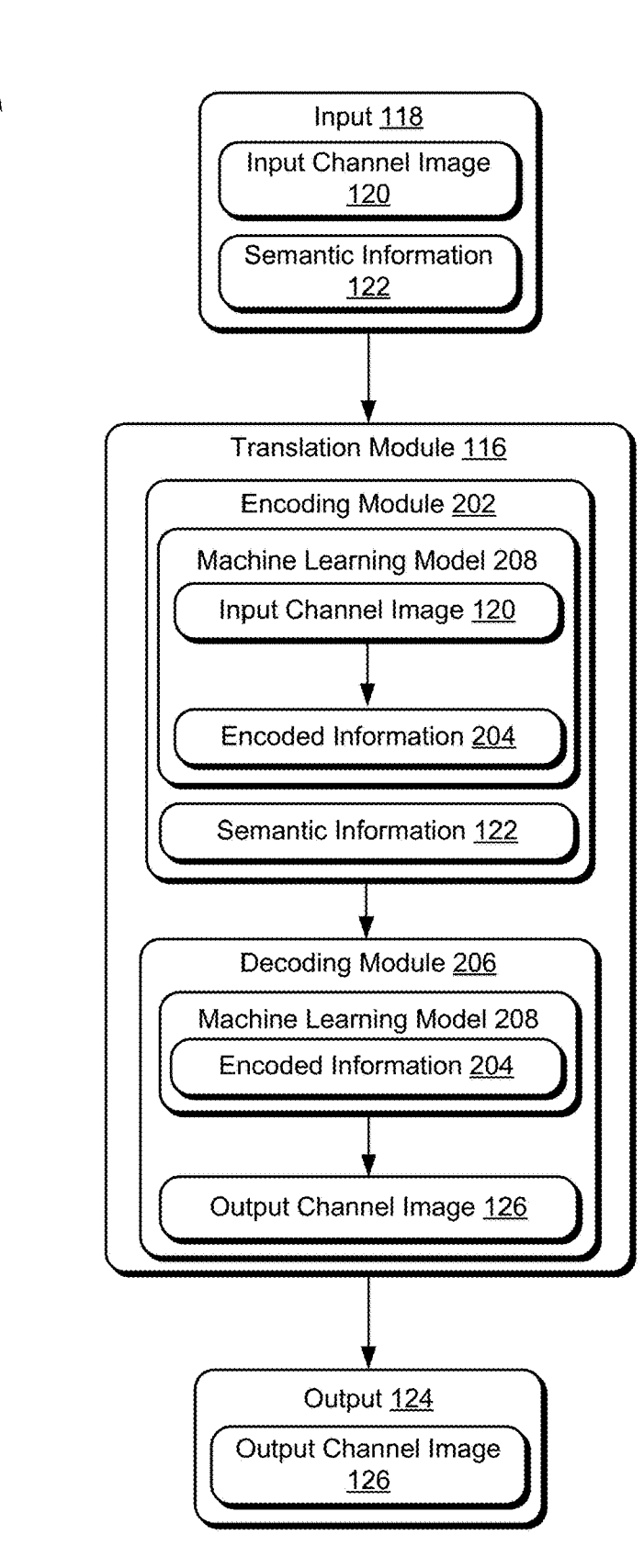
FIG. 2 depicts a system in an example implementation showing operation of a translation module for translating images based on semantic information.

FIG. 2 depicts a system 200 in an example implementation showing operation of the translation module 116 of FIG. 1 in greater detail. The following discussion describes techniques that are implementable utilizing the previously described systems and devices. Aspects of each of the procedures are implemented in hardware, firmware, software, or a combination thereof. The procedures are shown as a set of blocks that specify operations performed and/or caused by one or more devices and are not necessarily limited to the orders shown for performing the operations by the respective blocks. In portions of the following discussion, reference is made to FIGS. 1-7.

To begin in this example, a translation module 116 receives an input channel image 120 and semantic information 122 describing the input channel image 120. The semantic information 122 corresponds to a classification label in an index of multiple classification labels. For example, the classification label indicates a material category of multiple material categories. The material category indicated by the classification label in the index is manually selected or is automatically selected based on automated classification or automated material detection using the input channel image 120 in some examples.

The translation module 116 includes an encoding module 202. In this example, the encoding module 202 uses a machine learning model 208 to generate encoded information 204 based on the input channel image 120, including an embedding of the input channel image 120. The encoding module 202 then identifies an embedding vector, which is an encoded representation of a domain of the input channel image 120 and corresponds to the classification label of the semantic information 122. The encoding module 202 associates the embedding vector with the encoded information and repeats the embedding vector to comply with input size guidelines or a threshold input vector size for the machine learning model 208. The machine learning model 208, for example, is a U-Net convolutional neural network. The encoding module then concatenates the repeated embedding vectors for input into a bridge of the machine learning model 208.

The translation module 116 also includes a decoding module 206. The decoding module decodes the encoded information 204. While performing the decoding, the decoding module 206 learns features of the material described by the semantic information 122. Leveraging the learned features, the decoding module 206 generates an output channel image 126 that is different from the at least one input channel image based on the input channel image 120 and the decoded semantic information describing the input channel image 120.

The translation module 116 then generates an output 124 including the output channel image 126 for display in a user interface 110. For example, the output channel image 126 is a translated channel based on the input channel image 120 that includes different information than the input channel image 120.

FIGS. 3-7 depict stages of translating images based on semantic information. In some examples, the stages depicted in these figures are performed in a different order than described below.

Figure 3:
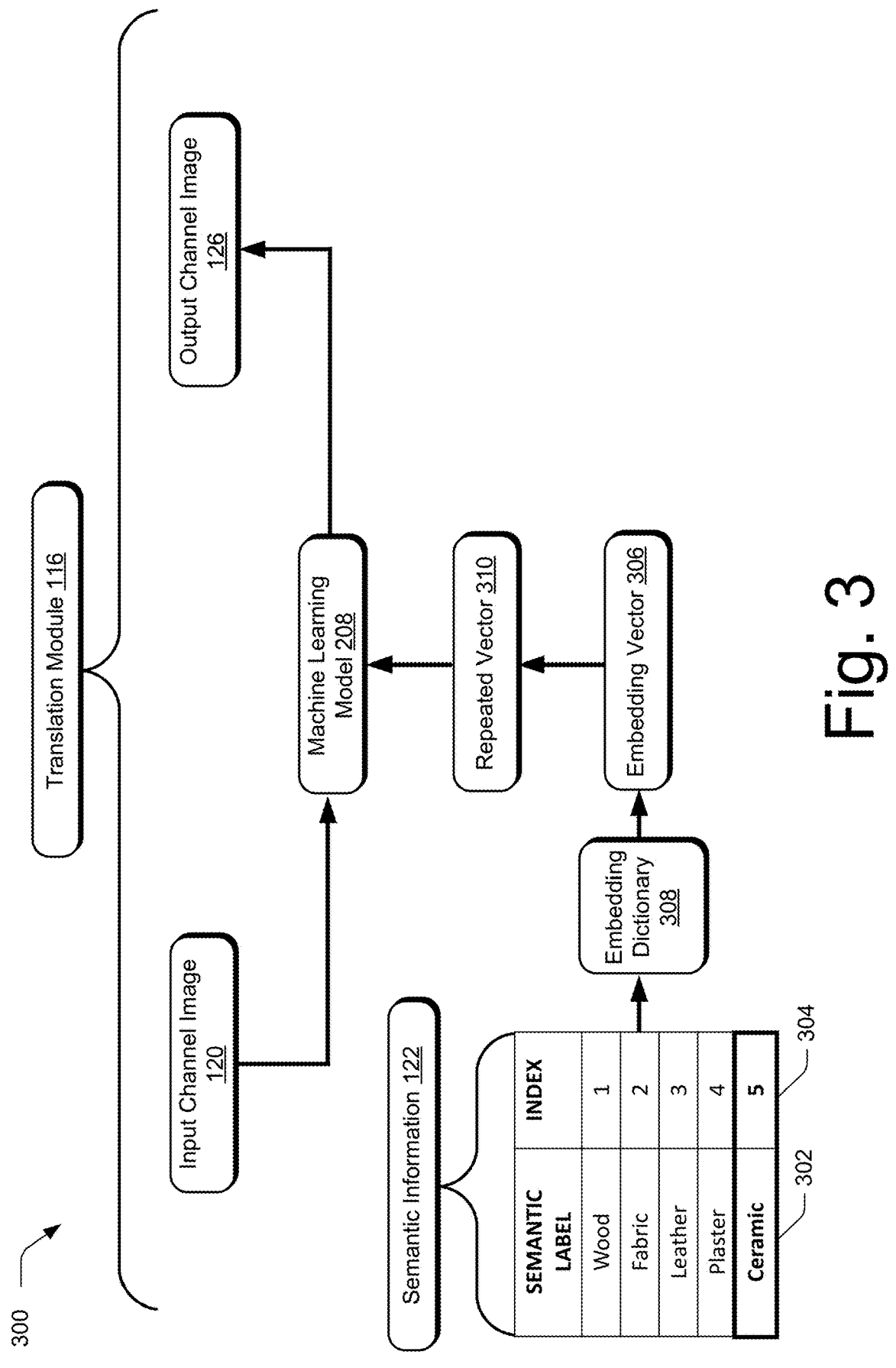
FIG. 3 depicts an example of encoding semantic information.

FIG. 3 depicts an example 300 of encoding semantic information 122. As illustrated, the translation module 116 receives an input channel image 120 and semantic information 122 and then translates the input channel image 120, or multiple input channel images, into an output channel image 126 that is different from the input channel image 120.

In this example, the semantic information 122 is organized in a table of semantic labels and corresponding indexes, including the form of discrete labels $(X_n, c_n, Y_n)_{n=1 \ldots N}$. For example, the semantic labels describe specific material categories that correspond to an index, including "Wood" corresponding to "1," "Fabric" corresponding to "2," "Leather" corresponding to "3," "Plaster" corresponding to "4," and "Ceramic" corresponding to "5." The semantic information 122 describes features and attributes of a material that supplements translation of the input channel image 120 into the output channel image 126. Semantic information 122 is selected based on an identity of a material depicted in the input channel image 120. In this example, the translation module 116 receives a user selection identifying the semantic label 302 for "Ceramic," which corresponds to the index 304 of "5." For example, a user manually selects the semantic label 302 based on a known identity of a material depicted in the input channel image 120. In other examples, the translation module 116 automatically identifies the semantic information 122 using automated classification or automatic material detection of a material depicted in the input channel image 120. In other examples, the semantic information 122 describes other attributes of data, including experimental or statistical data, patient information, or other data unrelated to material classifications.

The index corresponding to the semantic label identifies an embedding vector 306 in an embedding dictionary 308, which is a learnable lookup table of shape $N_s \times C_s$, including labels of $N_s$ values to fetch an embedding vector 306 of size $C_s$. In this example, the index 304 of "5" corresponds to an embedding vector 306, represented as $C_s \times 1 \times 1$. In some examples, the embedding vector 306 is a frozen random vector or a frozen vector of sinusoidal features. The translation module 116 then generates a repeated vector 310 represented as $C_S \times H_B \times W_B$ to meet an input vector size for the machine learning model 208.

In this example, the machine learning model 208 is a U-Network ("U-Net"), M. A U-Net is a type of convolutional neural network (CNN) architecture used for image segmentation, medical image analysis, and biomedical image segmentation. The U-Net architecture includes an encoding path (contracting path) and a decoding path (expansive path). In the encoding path, successive convolutional and pooling layers are used to extract features and reduce the spatial dimensions. After multiple down-sampling steps, the encoding path reaches a bottleneck layer, where spatial dimensions are minimized, and the network holds a compressed representation of the input. In the decoding path, the feature maps are successively upsampled and combined with the corresponding feature maps from the encoding path through skip connections. The skip connections enable the network to use information from different resolutions and facilitate capturing both low-level and high-level features. The U-shaped architecture, with the contracting and expansive paths, allows the network to capture context information effectively while also preserving spatial information.

For example, the machine learning model 208 M has an input size $C_{in} \times H_{in} \times W_{in}$, an output size $C_{out} \times H_{out} \times W_{out}$, encoding layers $$(L_k^{in})_{k=1 \ldots K},$$

decoding layers $$(L_k^{out})_{k=1 \ldots K},$$

and a bottleneck layer B with output size $C_B \times H_B \times W_B$. M is trained to solve a task $X \rightarrow Y$ where X is of shape $C_{in} \times H_{in} \times W_{in}$ and Y is of shape $C_{out} \times H_{out} \times W_{out}$. Additionally, M is trained on a dataset D of pairs $(X_n, Y_n)_{n=1 \ldots N}$. Because the machine learning model 208 is augmented with the semantic information 122 in the form of the embedding vector 306, the machine learning model 208 is edited to solve the task $(X, c) \rightarrow Y$.

In the bottleneck of the machine learning model 208, a spatially homogeneous tensor based on the repeated vector 310 is concatenated channel-wise and a subsequent convolution is edited to handle additional input channels. After the embedding vector 306 is identified from the embedding dictionary 308, the embedding vector 306 is repeated spatially to match a special size of the bottleneck output, forming the repeated vector 310. The repeated vector 310 is concatenated and input to the bottleneck of the machine learning model 208.

The machine learning model 208 is trained using conditional dropout. Dropout regularization is a technique that helps prevent overfitting in neural networks by randomly setting outputs of a layer to zero during training to reduce reliance of the network on particular features, thus improving the generalization of the machine learning model 208. In conditional dropout, the dropout is applied selectively based on the input data or some other conditions. For example, the machine learning model 208 is presented with random training samples $(X_i, c_i, Y_i)$, ensuring the labels, including the "processing regimes," are encountered. In some examples, a condition is dropped for a fraction $p_s$ of the time. For example, the lookup table of the embedding dictionary 308 is augmented with an extra "null" embedding to support correct behavior of the machine learning model 208 when label information is not available.

For example, the machine learning model 208 learns features from the semantic information 122 while decoding the encoded semantic information and leverages the features to generate the output channel image 126 based on the input channel image 120. The translation module 116 then generates an output 124 including the output channel image 126 for display in the user interface 110, further examples of which are described in the following sections and shown in corresponding figures.

In some examples, the input size or output size of the machine learning model 208 is adjusted. Additionally or alternatively, the size $C_s$ of the conditioning vectors of the machine learning model 208 is adjusted. In some examples, the number of labels is adjusted for the machine learning model 208, including stacking more than one vector to the bottleneck of the machine learning model 208 in some example. Additionally or alternatively, the embedding dictionary 308 or repeated vector 310 is concatenated channel-wise at a level of the encoder or the decoder of the machine learning model 208.

FIG. 4 depicts an example 400 of a chart comparing material channels generated using translating images based on semantic information to channel images generated using conventional techniques. As illustrated, sample 402 depicts a normal channel generated using conventional techniques ("old") and a normal channel generated using translating images based on semantic information ("new"). For example, the new normal channel is more accurate, more homogeneous, and more structured than the old normal channel.

Sample 404 depicts a height channel generated using conventional techniques ("old") and a height channel generated using translating images based on semantic information ("new"). For example, the new height channel is more accurate, more homogeneous, and more structured than the old height channel.

Sample 406 depicts a base color channel generated using conventional techniques ("old") and a base color channel generated using translating images based on semantic information ("new"). For example, the new base color channel is more accurate than the old base color channel.

Sample 408 depicts a height channel generated using conventional techniques ("old") and a height channel generated using translating images based on semantic information ("new"). For example, the new height channel interprets drawn patterns better than the old height channel and decorrelates patterns from geometry to generate flatness more accurately than the old height channel.

Sample 410 depicts a normal channel generated using conventional techniques ("old") and a normal channel generated using translating images based on semantic information ("new"). For example, the new normal channel interprets volumes better than the old normal channel and decorrelates patterns from geometry to generate flatness more accurately than the old normal channel.

Sample 412 depicts a height channel generated using conventional techniques ("old") and a height channel generated using translating images based on semantic information ("new"). For example, the new height channel is more accurate than the old height channel.

Sample 414 depicts a normal channel generated using conventional techniques ("old") and a normal channel generated using translating images based on semantic information ("new"). For example, the new normal channel is more accurate than the old normal channel.

Sample 416 depicts a base color channel generated using conventional techniques ("old") and a base color channel generated using translating images based on semantic information ("new"). For example, the new base color channel is more accurate than the old base color channel.

Sample 418 depicts a height channel generated using conventional techniques ("old") and a height channel generated using translating images based on semantic information ("new"). For example, the new height channel is more accurate than the old height channel.

Sample 420 depicts a normal channel generated using conventional techniques ("old") and a normal channel generated using translating images based on semantic information ("new"). For example, the new normal channel is more accurate than the old normal channel.

Sample 422 depicts a base color channel generated using conventional techniques ("old") and a base color channel generated using translating images based on semantic information ("new"). For example, the new base color channel is more accurate than the old base color channel.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-7.

FIG. 5 depicts a procedure 500 in an example implementation of translating images based on semantic information 122. At block 502 an input image in a first format, encoded semantic information describing a domain of the input image, and a selection of a second format are received. For example, the input image is one of multiple layered channel images that form an overall image. In some examples, the encoded semantic information corresponds to a classification label in an index of multiple classification labels. In some examples, the classification label in the index is manually selected. In other examples, the classification label in the index is automatically selected based on automated classification. In some examples, the encoded semantic information is an embedding vector 306 that corresponds to the classification label in the index.

At block 504, the encoded semantic information is decoded using a machine learning model 208. In some examples, the embedding vector 306 is repeated to meet a threshold input vector size for the machine learning model 208. Additionally or alternatively, the machine learning model 208 is trained using conditional dropout. Additionally or alternatively, the machine learning model 208 generates the embedding vector 306 based on data from the classification label in the index.

At block 506, an output image in the second format is generated by translating the input image from the first format to the second format using the machine learning model 208, the machine learning model 208 guided by the decoded semantic information.

At block 508, the output image in the second format is displayed in a user interface 110.

FIG. 6 depicts a procedure 600 in an additional example implementation of translating images based on semantic information. At block 602, an embedding vector 306 is received at a connection between an encoding path and a decoding path of a machine learning model 208, the embedding vector 306 including encoded semantic information describing features of a domain of a digital image. For example, the semantic information corresponds to a classification label in an index of multiple classification labels. In some examples, the classification label in the index is manually selected. In other examples, the classification label in the index is automatically selected based on automated classification. For example, the digital image is one of multiple layered channel images of an overall image.

At block 604, the semantic information 122 of the embedding vector 306 is decoded using the decoding path of the machine learning model 208. In some examples, the embedding vector 306 is repeated to meet a threshold input vector size for the machine learning model 208.

At block 606, the machine learning model 208 is trained on the domain of the digital image while decoding the encoded semantic information of the embedding vector 306 using the decoding path of the machine learning model 208. In some examples, the machine learning model 208 is trained using conditional dropout.

Example System and Device

Figure 7:
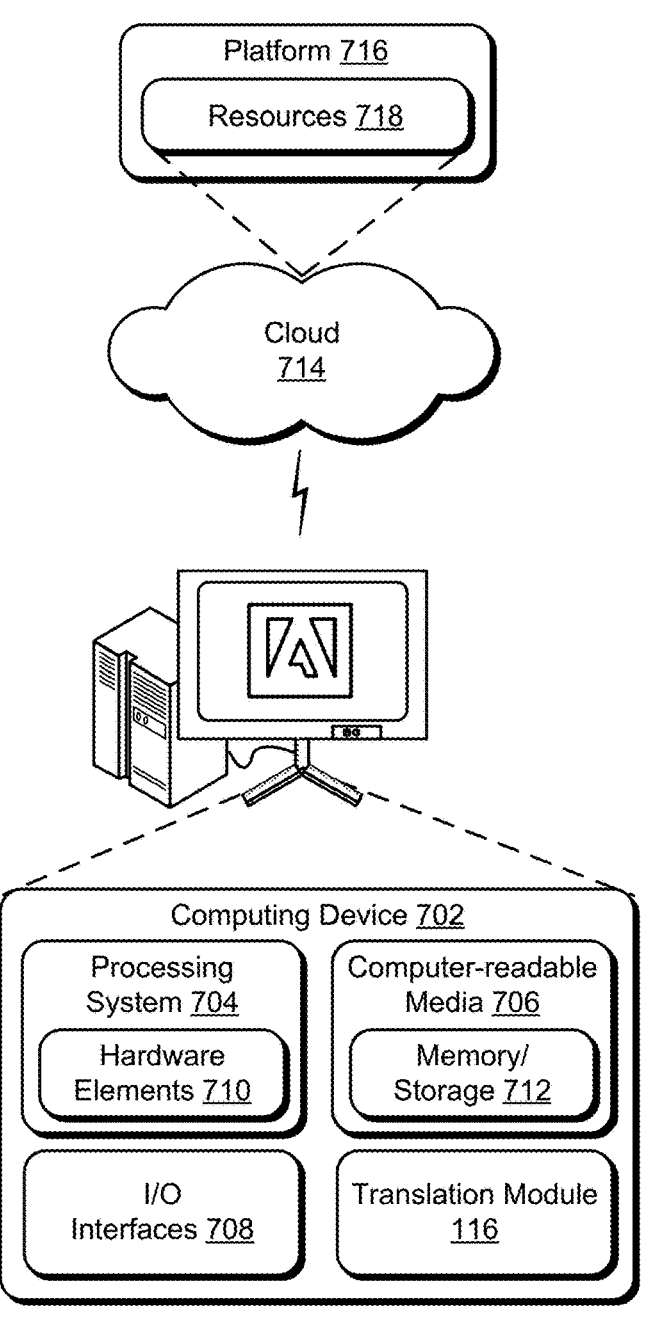
FIG. 7 illustrates an example system including various components of an example device that can be implemented as any type of computing device as described and/or utilized with reference to FIGS. 1-6 to implement embodiments of the techniques described herein.

FIG. 7 illustrates an example system generally at 700 that includes an example computing device 702 that is representative of one or more computing systems and/or devices that implement the various techniques described herein. This is illustrated through inclusion of the translation module 116. The computing device 702 is configurable, for example, as a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that is configurable as processors, functional blocks, and so forth. This includes implementation in hardware as an application specific integrated circuit or other logic device formed using one or more semiconductors. The hardware elements 710 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 706 is illustrated as including memory/storage 712. The memory/storage 712 represents memory/storage capacity associated with one or more computer-readable media. The memory/storage 712 includes volatile media (such as random access memory (RAM)) and/or nonvolatile media (such as read only memory (ROM), Flash memory, optical disks, magnetic disks, and so forth). The memory/storage 712 includes fixed media (e.g., RAM, ROM, a fixed hard drive, and so on) as well as removable media (e.g., Flash memory, a removable hard drive, an optical disc, and so forth). The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 710. The computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (for example, one or more computing devices and/or processing systems 704) to implement techniques, modules, and examples described herein.

The techniques described herein are supported by various configurations of the computing device 702 and are not limited to the specific examples of the techniques described herein. This functionality is also implementable through use of a distributed system, such as over a "cloud" 1114 via a platform 716 as described below.

The cloud 714 includes and/or is representative of a platform 716 for resources 718. The platform 716 abstracts underlying functionality of hardware (e.g., servers) and software resources of the cloud 714. The resources 718 include applications and/or data that can be utilized when computer processing is executed on servers that are remote from the computing device 702. Resources 718 can also include services provided over the Internet and/or through a subscriber network, such as a cellular or Wi-Fi network.

The platform 716 abstracts resources and functions to connect the computing device 702 with other computing devices. The platform 716 also serves to abstract scaling of resources to provide a corresponding level of scale to encountered demand for the resources 718 that are implemented via the platform 716. Accordingly, in an interconnected device embodiment, implementation of functionality described herein is distributable throughout the system 700. For example, the functionality is implementable in part on the computing device 702 as well as via the platform 716 that abstracts the functionality of the cloud 714.

What is claimed is:

1. A method comprising:
receiving, by a processing device, an input image in a first format, a selection of a second format, and semantic information describing a type of content depicted in the input image and selected from an index of multiple types of content;
generating, by the processing device, an output image depicting the content in the second format by translating the input image from the first format to the second format using a machine learning model, the machine learning model guided by the semantic information; and
displaying, by the processing device, the output image in the second format in a user interface.

2. The method of claim 1, wherein the input image is one of multiple layered channel images that form an overall image.

3. The method of claim 1, wherein the semantic information corresponds to a classification label in the index.

4. The method of claim 3, wherein the classification label in the index is manually selected.

5. The method of claim 3, wherein the classification label in the index is automatically selected based on automated classification.

6. The method of claim 3, wherein the semantic information is an embedding vector that corresponds to the classification label in the index.

7. The method of claim 6, wherein the machine learning model generates the embedding vector based on data from the classification label in the index.

8. The method of claim 6, wherein the embedding vector is adjusted to meet a threshold input vector size for input to the machine learning model.

9. The method of claim 1, wherein the machine learning model is trained using conditional dropout.

10. A system comprising:
a memory component; and
a processing device coupled to the memory component, the processing device to perform operations comprising:
receiving an embedding vector at a connection between an encoding path and a decoding path of a machine learning model, the embedding vector including encoded semantic information describing a type of content depicted in a digital image and selected from an index of multiple types of content; and
training the machine learning model on the type of the content of the digital image while decoding the encoded semantic information of the embedding vector using the decoding path of the machine learning model.

11. The system of claim 10, wherein the encoded semantic information corresponds to a classification label in the index.

12. The system of claim 11, wherein the classification label in the index is manually selected.

13. The system of claim 11, wherein the classification label in the index is automatically selected based on automated classification.

14. The system of claim 10, wherein the digital image is one of multiple layered channel images of an overall image.

15. The system of claim 10, wherein the machine learning model is trained using conditional dropout.

16. The system of claim 10, wherein the embedding vector is adjusted to meet a threshold input vector size for input to the machine learning model.

17. A non-transitory computer-readable storage medium storing executable instructions, which when executed by a processing device, cause the processing device to perform operations comprising:
receiving an input image in a first format, a selection of a second format, and encoded semantic information describing a type of content depicted in the input image an selected from an index of multiple types of content;
decoding the encoded semantic information using a machine learning model;
generating an output image depicting the content in the second format by translating the input image from the first format to the second format using the machine learning model, the machine learning model guided by the decoded semantic information; and
displaying the output image in the second format in a user interface.

18. The non-transitory computer-readable storage medium of claim 17, wherein the encoded semantic information describing the input image corresponds to a classification label in the index.

19. The non-transitory computer-readable storage medium of claim 18, wherein the encoded semantic information describing the input image includes an embedding vector that corresponds to the classification label in the index.

20. The method of claim 1, wherein the content depicted in the input image is a surface of a material, and the index of the multiple types of content correspond to different types of materials.

* * * * *